United States Patent Office 3,226,379
Patented Dec. 28, 1965

3,226,379
NOVEL 1,3-BIS(POLYHYDROXYALKYL)-2-IMID-AZOLIDINONES AND 1,3-BIS(POLYHYDROXY-ALKYL)-IMIDAZOLIDINE-2-THIONES
Paul R. Steyermark, Silver Spring, Md., assignor to W. R. Grace & Co., New York, N.Y., a corporation of Connecticut
No Drawing. Filed Jan. 14, 1964, Ser. No. 337,545
3 Claims. (Cl. 260—211)

The present invention relates to the preparation of novel derivatives of aldose-diamine condensation products, and more specifically to the preparation of 1,3-bis-(polyhydroxyalkyl)-2-imidazolidinones and 1,3-bis-(polyhydroxyalkyl)-imidazolidine-2-thiones.

It is known that N,N' disubstituted 2-imidazolidinones and imidazolidine-2-thiones may be prepared by reacting N,N'-disubstituted ethylenediamines with phosgene or carbon disulfide as follows:

$$RNHCH_2-CH_2NHR + COCl_2 \longrightarrow RN\overset{\overset{O}{\|}}{\underset{\diagup\diagdown}{C}}\underset{CH_2-CH_2}{}NR$$

and $$RNHCH_2-CH_2NHR + CS_2 \longrightarrow RN\overset{\overset{S}{\|}}{\underset{\diagup\diagdown}{C}}\underset{CH_2-CH_2}{}NR$$

wherein R represents alkyl, aryl or hydrogen.

Due to the fact both phosgene and carbon disulfide are known to react with a plurality of adjacent hydroxy groups to form cyclic carbonates and thiocarbonates respectively, the above synthesis has never been applied wherein polyhydroxyalkyl substituted ethylenediamines are utilized as the N,N'-disubstituted ethylenediamine reactant.

Hence, to date no one has disclosed or suggested that useful 2-imidazolidinone and imidazolidine-2-thione derivatives may be prepared from aldosealkylamine condensation products such as diglucosyl ethylenediamine.

It is therefore an object of the present invention to provide novel 2-imidazolidinones and imidazolidine-2-thione derivatives of polyhydroxyalkylamines.

It is another object to provide efficient methods for preparing good yields of 1,3-bis-(polyhydroxyalkyl)-2-imidazolidinones and 1,3-bis-(polyhydroxyalkyl)-imidazolidine-2-thiones by a route heretofore believed unfeasible by those skilled in the art.

These and still further objects will become readily apparent to those skilled in the art from the following description and specific examples.

Broadly the present invention contemplates compounds having the general formula:

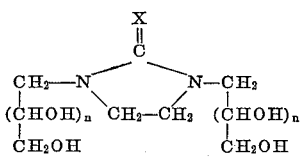

wherein X represents oxygen or sulfur, and $n$ is an integer having the value of 1 to 4.

More specifically, I have made the surprising discovery that when N,N'-bis-(polyhydroxyalkyl)-ethylenediamines having the general formula:

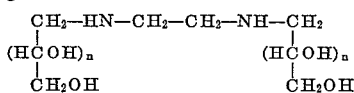

wherein $n$ represents an integer having a value of from 1 to 4, are reacted with phosgene or carbon disulfide in aqueous solution, good yields of the corresponding 2-imidazolidinones and imidazolidine-2-thiones respectively are readily obtained. No formation of the expected cyclic carbonate or thiocarbonate compounds occurs.

The N,N' - bis - (polyhydroxyalkyl) - ethylenediamines used in my process are obtained by condensing an aldose with ethylenediamine and subsequently hydrogenating the condensation products in the presence of a suitable hydrogenating catalyst. These condensation products are well known to those skilled in the art. A typical synthesis is reported by E. Mitts and K. M. Hixon, J.A.C.S. 66; 483–6 (1944) and may be illustrated as follows:

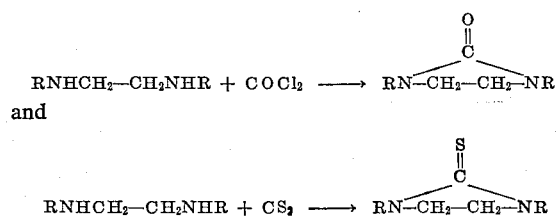

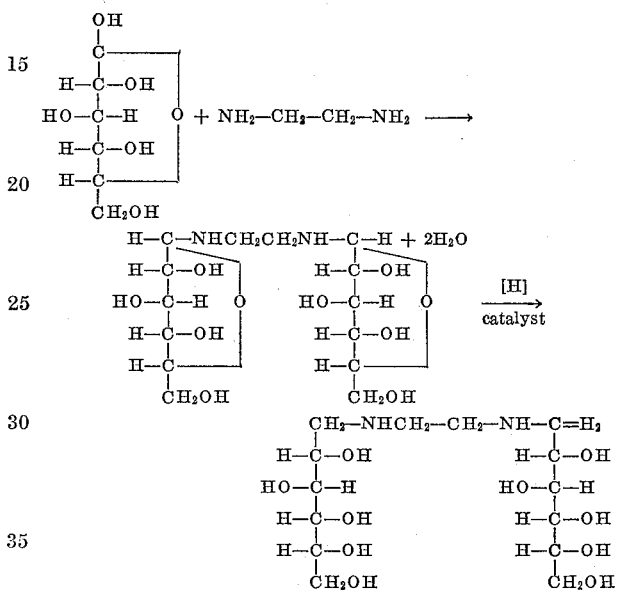

*Preparation of 2-imidazolidinone derivatives*

When the above N,N'-bis-(polyhydroxyalkyl)ethylene diamines are reacted with phosgene in the presence of a base, the following reaction takes place to obtain the intended compounds.

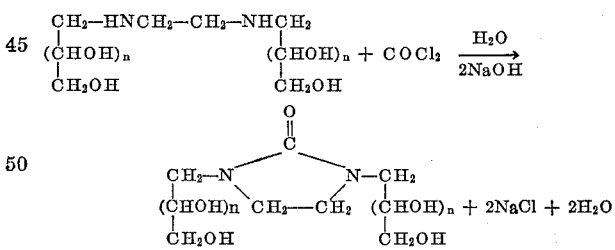

Suitable alkaline compounds which may be used to render the reaction medium basic are inorganic bases such as sodium hydroxide, sodium carbonate; organic bases such as lower tertiary alkyl amines which include triethylamine, trimethylamine and so forth; and basic ion exchange resins. The concentration of the basic aqueous reaction medium is generally about 0.5 normal to about 5 normal. The reaction takes place at a temperature from about —10° to 50° C. and preferably at from about —5° to 5° C.

At the temperatures specified above, the reaction is practically instantaneous and occurs exothermically. After the reaction is completed the ionic by-products may be conveniently removed along with the excess amine by passing the reaction mixture through an acid ion exchange resin. Subsequent to removal of the ionic components, the products may be recovered by dehydrating the reaction mixture and subsequently recrystallizing the reaction products from organic solvents such as methanol and ethanol.

In general, phosgene is added in excess of the theoretical amount required to react with the amount of polyhydroxyalkyl-ethylenediamine present, however a lesser amount may be used if maximum yield is not an objective.

*Preparation of imidazolidine-2-thione derivatives*

When the above N,N'-bis-(polyhydroxyalkyl)ethylenediamines are reacted in aqueous solution with carbon disulfide the following reactions take place to obtain the intended compounds (I).

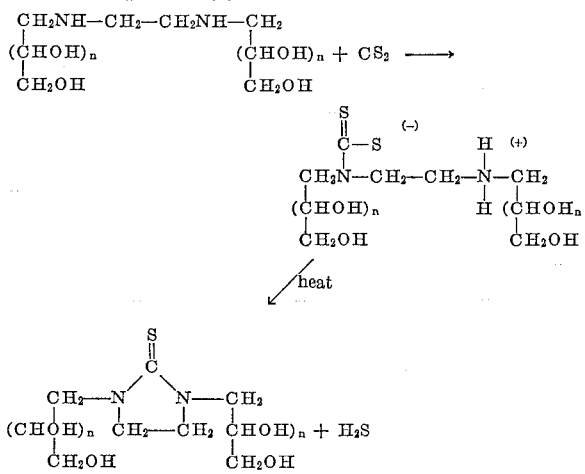

In the first step of the above reaction, formation of a dithiocarbamate takes place at a temperature from about −5° to 40° C. The second phase of the reaction is caused by heating the dithiocarbamate at from about 40° C. to boiling (about 100° C. at atmospheric pressure) during which time hydrogen sulfide is evolved from the reaction mixture.

At the temperatures specified above, the first reaction is very fast (practically instantaneous), but the second may require up to 8 hours to reach completion. The products may be recovered by dehydrating the reaction mixture and subsequently recrystallizing the reaction products from organic solvents such as methanol and ethanol.

In general, carbon disulfide is added in slight excess of the theoretical amount required to react with the amount of polyhydroxyalkylethylene diamine present, however, a stoichiometric amount may be used.

Having described the essential elements of the present invention the following specific examples are given to illustrate specific embodiments thereof.

EXAMPLE I 26 grams (0.067 mole) of N,N'-bis-(D-gluco-pentahydroxyhexyl)-ethylenediamine was dissolved in 80 milliliters of 2-normal sodium hydroxide. The solution was then cooled to about 0° C. by means of a melting ice bath and 10.2 g. (0.103 mole) of phosgene was slowly introduced through a gas inlet tube. After the phosgene addition, the solution was allowed to warm to room temperature and was maintained thereat for one hour. Subsequently, the reaction solution was passed through an ion exchange resin and evaporated at a reduced pressure. The residue was taken up in methanol, and subsequently cooled at 4° C. for 24 hours. The solid material which separated was then vacuum dried at 65° C. to a constant weight.

The dry product weighed 21 grams (75% yield) and melted at 134 to 135° C. after recrystallization from water-acetone and water-methanol solution. The material had a specific optical rotation $[\alpha]_D^{24} = -1.2°$ and exhibited strong infra-red absorption at 1655 cm.$^{-1}$. This infrared absorption is ascribed to a tertiary amide carbonyl which has been reported at 1650 to 1660 cm.$^{-1}$.

*Analysis*: Calculated for $C_{15}H_{30}N_2O_{11}$: C, 43.47; H, 7.30; N, 6.76. Found: C, 42.83; H, 7.18; N, 6.45; ash, 0.40.

EXAMPLE II

To a solution of 12 g. (0.031 mole) of N,N'-bis-(D-gluco-pentahydroxyhexyl)-ethylenediamine in 75 ml. of water was added dropwise 2.7 g. (0.035 mole) of carbon disulfide with stirring until a homogenous solution was formed. It was refluxed for five hours, during which time hydrogen sulfide was evolved. The solution was then evaporated to dryness at a reduced pressure. The solid residue was washed with absolute methanol and vacuum dried. The crude material melted at 151–180° C. and weighed 9.5 g. (71% yield). Several recrystallizations from aqueous methanol raised the melting point to 189–190° C. The pure material weighed 7.8 g. (58% yield).

*Analysis*: Calculated for $C_{15}H_{30}N_2O_{10}S$: C, 41.85; H, 7.03; N, 6.51; S, 7.45. Found: C, 42.18; H, 7.34; N, 6.70; S, 7.14. (In percent by weight.)

The product, therefore, is considered to be 1,3-bis-(D-gluco-pentahydroxyhexyl)-imidazolidine-2-thione.

The compounds of the present invention have been found useful as additives for electroplating processes. Furthermore, when the compounds of the present invention are esterified with at least one mole of a long chain fatty acid they exhibit surface active properties.

The present application is a continuation-in-part of my previously filed applications S.N. 133,570, filed August 24, 1961 and S.N. 134,035, filed August 24, 1961, now abandoned.

I claim:
1. A compound of the formula

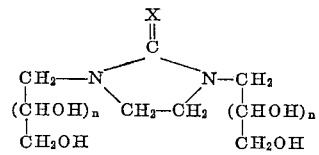

wherein *n* has a value of 4, and X is selected from the group consisting of oxygen and sulphur.

2. The compound 1,3-bis-(pentahydroxyhexyl)-2-imidazolidinone.

3. The compound 1,3-bis-(pentahydroxyhexyl)-2-imidazolidine-2-thione.

References Cited by the Examiner
UNITED STATES PATENTS 2,853,513   9/1958   McKay et al. _____ 260—309.7
2,883,321   4/1959   Gaertner _____ 260—309.7

OTHER REFERENCES

Elderfield, "Heterocyclic Compounds," vol. 5, 1957, pp. 250–251, John Wiley and Sons, Inc., New York, N.Y.
Harris et al., J.A.C.S., vol. 66, 1944, pp. 1756–1757.

LEWIS GOTTS, *Primary Examiner.*